(12) United States Patent
Takao et al.

(10) Patent No.: US 7,431,910 B2
(45) Date of Patent: Oct. 7, 2008

(54) PROCESS FOR PREPARING ZIRCONIUM-CERIUM-BASED MIXED OXIDES

(75) Inventors: Yasuhide Takao, Shizuoka (JP); Colin Norman, Sale (GB); Gavin Edwards, Bromley Cross (GB); Ian Chisem, Appleton (GB)

(73) Assignee: Magnesium Elektron Ltd., Manchester (GB)

( * ) Notice: Subject to any disclaimer, the term of this patent is extended or adjusted under 35 U.S.C. 154(b) by 624 days.

(21) Appl. No.: 10/494,021

(22) PCT Filed: Oct. 30, 2002

(86) PCT No.: PCT/GB02/04915

§ 371 (c)(1),
(2), (4) Date: Oct. 25, 2004

(87) PCT Pub. No.: WO03/037506

PCT Pub. Date: May 8, 2003

(65) Prior Publication Data

US 2006/0088463 A1    Apr. 27, 2006

(30) Foreign Application Priority Data

Nov. 1, 2001    (JP) .............................. 2001-336703

(51) Int. Cl.
| | |
|---|---|
| C01G 25/02 | (2006.01) |
| C01F 17/00 | (2006.01) |
| B01J 23/10 | (2006.01) |
| B01J 21/06 | (2006.01) |
| B01J 27/53 | (2006.01) |
| C04B 35/48 | (2006.01) |

(52) U.S. Cl. ............... 423/594.12; 423/263; 423/593.1; 423/608; 501/103; 501/126; 502/217; 502/304; 502/349; 502/439

(58) Field of Classification Search ................. 502/304, 502/217, 349, 439; 501/103, 126; 423/608, 423/594.12, 263, 593.1
See application file for complete search history.

(56) References Cited

U.S. PATENT DOCUMENTS

| | | | | |
|---|---|---|---|---|
| 5,607,892 A | * | 3/1997 | Chopin et al. | ............... 502/304 |
| 5,723,101 A | * | 3/1998 | Cuif | ......................... 423/592.1 |
| 5,747,401 A | * | 5/1998 | Cuif | ........................... 501/103 |
| 5,898,014 A | * | 4/1999 | Wu et al. | ..................... 502/302 |
| 6,037,305 A | * | 3/2000 | Cuif et al. | .................... 502/304 |
| 6,150,299 A | * | 11/2000 | Umemoto et al. | ........... 502/304 |
| 6,255,242 B1 | * | 7/2001 | Umemoto et al. | ........... 501/103 |

(Continued)

FOREIGN PATENT DOCUMENTS

CN    1282269    1/2001

(Continued)

*Primary Examiner*—Ngoc-Yen M. Nguyen
*Assistant Examiner*—Diana J Liao
(74) *Attorney, Agent, or Firm*—Pearne & Gordon LLP

(57) ABSTRACT

A process for preparing zirconium-cerium-based mixed oxides which comprises reacting an alkali with an aqueous solution of a zirconium salt containing 0.42-0.7 mole of sulphate anion ($SO_4^{2-}$) per mole of zirconium cation at a temperature of not greater than 50° C., in the presence of a cerium salt to form a cerium-zirconium mixed hydroxide, and then calcining the cerium—zirconium mixed hydroxide to form a mixed oxide. The mixed oxides possess good thermal stability and are essentially single phase and are suitable as promoters and catalyst supports in, particularly, automobile exhaust systems.

20 Claims, 1 Drawing Sheet

U.S. PATENT DOCUMENTS 6,358,880 B1 * 3/2002 Hedouin et al. ............. 502/302
2002/0115563 A1 * 8/2002 Blanchard et al. ........... 502/304

FOREIGN PATENT DOCUMENTS

| | | |
|---|---|---|
| EP | 0963951 A | 12/1999 |
| EP | 1035074 A | 9/2000 |
| FR | 2756819 | 6/1998 |
| JP | 11292539 A | 10/1999 |
| WO | WO9702213 A | 1/1997 |
| WO | WO 98 16472 A | 4/1998 |
| WO | WO 9924153 | 5/1999 |

\* cited by examiner

PROCESS FOR PREPARING ZIRCONIUM-CERIUM-BASED MIXED OXIDES

FIELD OF TECHNOLOGY

This invention relates to a process for preparing zirconium—cerium-based mixed oxides which are thermally stable, i.e. heat-resistant, at elevated temperatures and highly homogeneous in their crystal phase and, more particularly, to a process for preparing zirconium—cerium-based mixed oxides which are useful as promoters or catalyst supports in automobile exhaust gas purification systems, though not limited thereto. The invention extends to both the promoters and the catalyst supports and to automobile exhaust systems containing such mixed oxides.

BACKGROUND TECHNOLOGY

Zirconium—cerium-based mixed oxides as promoters or catalyst supports are generally known to perform better than zirconia or ceria alone.

A number of processes have been proposed for the preparation of such zirconium—cerium-based oxides: for example, a sol process which comprises mixing zirconium sol and cerium sol, adding alkali to the mixed sols to form precipitates, and calcining the precipitates [Japan Kokai Tokkyo Koho Hei 6-279,027 (1994)]; a process which comprises heating the particles of zirconium hydroxide with cerium sol in the presence of nitric acid to effect dissolution and reprecipitation, adding alkali, allowing the mixture to react further, and calcining the product followed by pulverising [Japan Kokai Tokkyo Koho Hei 10-194,742 (1998)]; and a process which comprises adding oxalic acid to an aqueous solution of acidic salts of zirconium and cerium to precipitate zirconium—cerium oxalate, thermally decomposing the resulting oxalate in a non-oxidising atmosphere and then heating the decomposed product in an oxidising atmosphere [Japan Kokai Tokkyo Koho Hei 11-165,067 (1999)].

The sol process has an advantage of yielding zirconium—cerium-based mixed oxides with a relatively large specific surface area, but it faces problems such as the necessity for advance preparation of sol which is a disadvantage in respect to cost and the dried and calcined product being hard and easy to aggregate.

The process which involves heating in the presence of nitric acid is advantageous in that the use of the particles of zirconium hydroxide keeps the product from aggregating and solidifying. However, a single crystal phase becomes difficult to obtain and the range of composition which can be prepared becomes narrow when the amount of $CeO_2$ is increased relative to that of $ZrO_2$.

The process involving thermal decomposition of the oxalate has an advantage of readily yielding zirconium—cerium-based mixed oxides of single crystal phase because of the formation of the oxalate by coprecipitation. This process, however, requires a heat treatment at elevated temperatures in order to conduct the thermal decomposition sufficiently which causes problems such as a decrease in specific surface area and an increase in calcining cost.

Japan Kokai Tokkyo Koho Hei 10-212,122 (1998) proposes fine zirconia-ceria particles and a process for preparing the same: the $ZrO_2$ particles by themselves are primary particles with a BET specific surface area of 40-200 $m^2/g$, an average particle diameter determined by electron microscopy of 0.1 µm or less and a ratio of the average particle diameter determined by electron microscopy to the average particle diameter determined from BET specific surface area of 0.9 or more and the molar ratio $CeO_2/ZrO_2$ is 5/95-60/40; the fine zirconia-ceria particles show high oxygen supply efficiency in exhaust gas, adsorb or release oxygen well at low exhaust gas temperatures and can be mixed homogeneously with three-way catalysts for purifying automotive exhaust gas.

The process of preparation described in the specification of the aforementioned patent, however, requires a long period of boiling, occasionally extending over several hundred hours, to effect the hydrolysis of an aqueous solution of zirconium salt to hydrated zirconia sol with an average particle diameter of 0.1 µm or less. Moreover, the hydrated zirconia sol thus obtained is too fine to permit the application of usual industrial procedures for solid-liquid separation such as filtration under reduced pressure, filtration under pressure and centrifugal separation. In consequence, a troublesome procedure such as sedimentation and separation of supernatant liquid would be required in the steps for filtration and water washing of the hydrated zirconia sol. An operation such as aggregation, if carried out during these steps, causes a sharp decrease in specific surface area. Furthermore, the specific surface area tends to diminish rapidly when calcination is effected at an elevated temperature close to the working temperature.

A process for efficiently preparing thermally durable zirconium—cerium-based mixed oxides is proposed in Japan Kokai Tokkyo Koho Hei 11-292,539 (1999): the process comprises dispersing basic zirconium sulphate in water, mixing the dispersion with a solution containing cerium ions such as a solution of cerium nitrate, adding alkali to the mixture to yield hydroxides, effecting solid-liquid separation of the hydroxides and calcining the hydroxides.

This process utilises basic zirconium sulphate with an average particle diameter of 0.5~20 µm and hence has an advantage of yielding zirconium—cerium-based mixed oxides with a relatively large specific surface area at elevated temperatures, for example, 100 $m^2/g$ or more at 400° C. and 30 $m^2/g$ or more at 1,000° C. However, basic zirconium sulphate with an average particle diameter of 0.5~20 µm must be prepared in advance, which requires an extra manufacturing step with a concomitant rise in cost. Besides, zirconium—cerium-based mixed oxides of single crystal phase become difficult to obtain as the addition of ceria and a third component oxide increases. Hence, the desired performance becomes difficult to obtain and, as a result, the performance of the mixed oxides as a catalyst/promoter deteriorates.

A further process of coprecipitation by means of ammonia or ammonium carbonate or the like, starting from a mixed solution of zirconium nitrate and cerium nitrate is also known (Japan Kokai Tokkyo Koho Hei 9-278444). However, the precipitate obtained by this process is a bulky mixed hydroxide in the form of a gel with a high water content; therefore productivity is poor and can hardly be regarded as suited to industrial scale production. In addition it states that it is necessary to have the cerium salt in the tetravalent state, which is difficult to control and is not necessary in the present invention.

Thus, a filtration process is essential in order to remove impurities from the gel precipitate, and the bulkiness of the precipitate means that unit treatment speed is also invariably slow. Moreover, the high water content increases the energy needed in order to convert it to the oxides.

The use of sulphate as a precipitation modifier has been used in Japan Kokai Tokkyo Koho Hei 8-34613 and 8-34614 (1996). These, together with Japan Kokai Tokkyo Koho Hei 8-34612 (1996), describe the production of yttria-doped zirconias. In 8-34612 and 8-34613 hydrogen peroxide is added to the zirconium salt as a masking agent in order to bring the pH's of precipitation of the zirconium and yttrium salts closer together to allow homogeneous precipitation. Sulphate is added to modify the precipitation in 8-34613 and 8-34614. In the former case urea is used as the precipitant and in the latter ammonia, but in three of these cases the use of alkali metal hydroxides is proscribed. Furthermore, the use of ammonia is to be deprecated because of its adverse environmental effects.

Accordingly, an object of this invention is to provide a process, easily practicable on a commercial scale, for preparing zirconium—cerium-based mixed oxides which not only possess good thermal stability at elevated temperatures but are also highly homogeneous in their crystal phase.

DISCLOSURE OF THE INVENTION

This invention relates to a process for preparing zirconium—cerium-based mixed oxides which comprises precipitating a zirconium—cerium mixed hydroxide from an aqueous solution by means of the addition of alkali in the presence of sulphate anions, the product preferably being essentially sulphate free, i.e. $SO_4^{2-}$ 0.1% by weight or less, preferably 0.05% by weight or less.

A variety of zirconium salts may be used as a raw material in this invention and preferred among them are zirconium oxychloride and/or zirconium nitrate preferably with a molar ratio of the chloride anion ($Cl^-$) or nitrate anion ($NO_3^-$) to zirconium cation ($Zr^{4+}$), i.e. the molar ratio $[(Cl^- \text{ or } NO_3^-)/Zr^{4+}]$, controlled normally at 1.5-4.0, and preferably at 2.0-3.0.

What occurs at a molar ratio $[(Cl^- \text{ or } NO_3^-)/Zr^{4+}]$ of less than 1.5 is that the thermal stability of zirconium—cerium-based mixed oxide is lowered. The thermal stability of zirconium—cerium-based mixed oxide is shown by the absence of any change in the phase content as shown by X-ray diffraction and the maintenance of its surface area during heating to about 950° C. Single phase material is also preferable because control of it and its performance are easier than with a multiphase material, although a small amount of multiphase material can sometimes be tolerated e.g. up to 0.5% by weight.

Conversely, at a molar ratio $[(Cl^- \text{ or } NO_3^-)/Zr^{4+}]$ of higher than 4.0, the $Cl^-$ or $NO_3^-$ anions present in the vicinity of the Zr species in the solution hinder the sulphate anion from modifying the gel precipitation process.

A variety of cerium salts are also available for use in this invention and preferable among them is cerium chloride or cerium nitrate. An aqueous solution of such cerium salt can be prepared by dissolving solid cerium chloride or cerium nitrate in water and it can also be prepared readily by dissolving cerium carbonate in hydrochloric acid or nitric acid.

The sulphate anion ($SO_4^{2-}$), the group to be added to an aqueous solution of zirconium salt for the purpose of modifying the precipitation process, is generally introduced in the form of either one kind of compound or a mixture of two kinds or more of compounds selected from a group of sulphuric acid, zirconium sulphate, cerium sulphate, sodium sulphate, potassium sulphate and ammonium sulphate, preferably in the form of sulphuric acid.

The addition is made at a rate of 0.42-0.7 mole, preferably 0.45-0.6 mole, of the sulphate anion to 1 mole of the zirconium cation ($Zr^{4+}$). Additions of less than 0.42 mole of the sulphate anion leads to insufficient modification of the precipitation, which leads to poor filtration and washing and, undesirably, the particles of zirconium—cerium-based mixed oxides to be obtained finally after drying and calcination join together firmly and solidify as a bulky mass. Conversely, additions of more than 0.7 mole of the sulphate anion causes an increase in the particle diameter, or a decrease in the area reactive with cerium and this makes it difficult to obtain zirconium—cerium-based mixed oxides of a single crystal phase.

The role of an aqueous alkali solution to be added is played, for example, by an aqueous solution of ammonia, sodium hydroxide or potassium hydroxide.

For the purpose of stabilising their specific surface area at elevated temperatures of the zirconium—cerium-based mixed oxides to be obtained finally after calcination and thereby improving their catalytic performance and heat resistance, it is allowable in this invention to incorporate in the zirconium—cerium-based mixed oxides 50% by weight or less of the mixed oxide of an oxide of a third component, either of one kind or a mixture of two kinds or more, selected from the rare earth metals, especially Pr, La, Nd and Y, alkaline earth metals consisting of Mg, Ca and Ba, and Al and Si.

Incorporation of such a third component in zirconium—cerium-based mixed oxides is effected by adding the chloride and/or nitrate of the third component, either of one kind or a mixture of two kinds or more, selected from the group of rare earth metals, especially Pr, La, Nd and Y, alkaline earth metals consisting of Mg, Ca and Ba, and Al and Si to the aqueous solution of zirconium salt and/or the slurry obtained during the manufacture of the zirconium—cerium-based mixed oxides, while making the addition in such a manner as to incorporate 50% by weight or less of the third component oxide in the final compound oxides. The addition of the third component salt during the manufacturing step may be made either to the aqueous solution of zirconium salt before precipitation or to the slurry after precipitation.

According to the process of this invention, alkali is added to the aforementioned aqueous solution of zirconium salt to form a precipitate. A slurry is then produced in which a cerium salt is dissolved and an aqueous alkali solution is added to the slurry to precipitate a zirconium—cerium mixed hydroxide.

The aforementioned cerium salt may be added in advance to the aqueous solution of zirconium salt before precipitation so that it is present at the time when precipitation occurs. Alternatively, it may be added to the slurry obtained after precipitation has commenced as described above to prepare the slurry.

Alkali,—the reagent which causes precipitation—is added preferably in the form of its solution in water and, is more preferably, added to the aqueous solution of zirconium salt after addition of the sulphate anion while stirring the reaction mixture. Preferably the addition is continued until the pH of the aqueous salt solution reaches a point in the range 1-2, preferably in the range 1.5-2 and the temperature of the aqueous solution of zirconium salt is kept at 50° C. or lower, preferably at 40° C. or lower. When the temperature of the aqueous solution of zirconium salt exceeds 50° C., a form of basic zirconium sulphate precipitates independently of the addition of alkali and, this form of basic zirconium sulphate, which is formed, lowers the thermal stability of the zirconium—cerium-based mixed oxides obtained.

There is no specific restriction to the concentration of the desired metals in the aqueous salt solution (or the concentration of the sum of the desired metals where the aqueous solution contains salts of cerium and a third component in addition to the zirconium salt) but it is preferable to control the concentration of the desired metals after the addition of the sulphate anion at 10-20% by weight calculated as oxide. There is also no specific restriction to the concentration of alkali to be added to the aqueous solution of zirconium salt, but it is preferable to control the concentration of alkali at 10-15% by weight. The thermal stability shows a tendency to deteriorate when the concentration of salts or alkali is too low. Conversely, at too high concentrations, flocculated precipitates tend to form with ease and they disperse poorly in the solution. As a result, the zirconium hydroxide gel formed by the addition of alkali shows low reactivity with the sulphate anion and some of the gel tends to remain unreacted; the zirconium—cerium-based mixed oxides then obtained after drying and calcination tend to form hard aggregates and, besides, the ratio of zirconia to ceria ($ZrO_2/CeO_2$) tends to be non-uniform.

After the precipitation of Zr to form a slurry in this manner, a cerium salt and/or a third component salt is added to the slurry as needed in a required amount to prepare a slurry containing the Zr precipitate, the cerium salt and the optional third component salt. To the resulting slurry is added dropwise an aqueous solution of alkali with a concentration of 5-20% by weight, preferably 10-15% by weight, to raise the pH, thereby allowing the alkali to react with the zirconium precipitate, the cerium salt and the third component salt in the slurry to form zirconium—cerium compound hydroxides.

In the normal course of the aforementioned reaction, the formation of zirconium—cerium mixed hydroxides begins at a pH of approximately 2 and becomes completed by the time the pH reaches approximately 8, although the progress of reaction varies with the composition of the slurry, for example, with the presence or absence of a third component salt in the slurry or with the kind of third component salt if present. The dynamically forming zirconium hydroxide exhibits enhanced reactivity with the simultaneously forming cerium hydroxide or third component hydroxide to promote the formation of compound hydroxides and, as a result, the zirconium—cerium-based mixed oxides obtained attain a homogeneous crystal phase.

The addition of the aqueous alkali solution may be terminated upon completion of the precipitation of cerium hydroxide and the third component hydroxide at or near pH 8 but the addition is preferably continued until the pH reaches 11 or more in order to obtain higher thermal stability in the calcined mixed oxide.

Furthermore, the temperature of the slurry is kept at 50° C. or lower, preferably 40° C. or lower, throughout this reaction. When the temperature exceeds 50° C., there is a tendency for zirconia and ceria to separate and not form a single crystal phase in the zirconium—cerium-based mixed oxides obtained finally after calcination. A procedure suitable for keeping the slurry at 50° C. or lower is to cool the slurry or, since the rise in temperature is particularly large until the pH reaches 3, to stop the dropwise addition of the aqueous alkali solution near pH 3, wait until the temperature drops and resume the addition.

The zirconium—cerium-mixed hydroxides thus formed are generally collected by filtration and washed until the contents of $Na_2O$, $K_2O$ and $SO_4^-$ become respectively 0.1% by weight or less, preferably 0.05% by weight or less, and that of chlorine ($Cl^-$) becomes 0.05% by weight or less, preferably 0.01% by weight or less.

The washed zirconium—cerium mixed hydroxides are generally dried normally at 80-200° C. preferably at 100-150° C.

The dried zirconium—cerium mixed hydroxides are generally calcined at a specified temperature, normally at 500-1000° C., preferably at 650-850° C. for 1-10 hours, preferably for 2-6 hours, and the calcined material is made into the end product by pulverising, as needed, to a specified particle size, normally to an average particle diameter in the range 0.5-10 μm, preferably in the range 1-5 μm.

The zirconium—cerium-based mixed oxides prepared by the process of this invention are not limited as to their composition and can be varied suitably in composition depending upon the end use, but they are usually composed of 90-10% by weight of zirconia ($ZrO_2$), 10-60% by weight of ceria ($CeO_2$) and 0-50% by weight of third component oxide. Where the sulphate anion is added as zirconium sulphate, the zirconia portion of the final mixed oxides contains zirconia originating from the zirconium sulphate. Likewise, where the sulphate anion is added as cerium sulphate, the ceria portion of the compound oxides contains ceria originating from the cerium sulphate.

The process of this invention enables the preparation of zirconium—cerium-based mixed oxides which are highly thermally stable and possess a single crystal phase even at high contents of ceria by precipitating fine particles from an aqueous solution of zirconium salt and then simultaneously forming zirconium hydroxide and cerium hydroxide from a slurry containing the precipitate and a cerium salt (and a optionally third component salt).

A plausible explanation is as follows: the precipitates obtained by placing the aqueous solution of zirconium salt of the said invention in contact with alkali are formed as extremely fine particles (normally secondary particles with a particle diameter of 0.1-0.4 μm composed of primary particles with a particle diameter of approximately 0.03-0.05 μm). During the formation of zirconium—cerium mixed hydroxides from the slurry containing the fine particles the cerium salt and the third component salt, the particles change to mixed hydroxides, with the simultaneous formation of cerium hydroxide and third component hydroxide, as the pH changes from 2 to 8. As a result the zirconium—cerium-based mixed oxides obtained attain a homogeneous crystal phase. Moreover, the diffusion of cerium (and third component if present.) precipitated on the surface of these fine particles of zirconium hydroxide into the interior of the particles during calcination is accomplished in the early stage of calcination because of the shortened distance required for the diffusion, and this contributes to the stabilisation of the structure in a state where the specific surface area is relatively large, resulting in the formation of thermally stable zirconium—cerium-based mixed oxides.

The fineness of the particles means a relatively large surface area, which can accommodate more sites for the reaction with cerium and an optional third component.

The process of this invention probably benefits from a combination of the aforementioned effects, thereby forming a single crystal phase even at high ceria contents, namely, forming a homogeneous crystal structure and producing zirconium—cerium-based mixed oxides with excellent performance as promoters or catalyst supports. The formation of such promoters and catalyst supports, and of the final automobile exhaust system incorporating them, are known per se.

According to the process of this invention, the operations from the initial feeding of raw materials to formation of the desired mixed hydroxides can be performed sequentially in a single reactor vessel, the desired zirconium—cerium-mixed hydroxides form in particles of a size adequate for easy filtration and washing and, besides, known procedures can be adopted for their drying and calcination. Hence, the process enables the preparation of zirconium—cerium-based mixed oxides of good thermal stability and homogeneous crystal phase easily on a commercial scale.

PREFERRED EMBODIMENTS OF THE INVENTION

Figure 1:
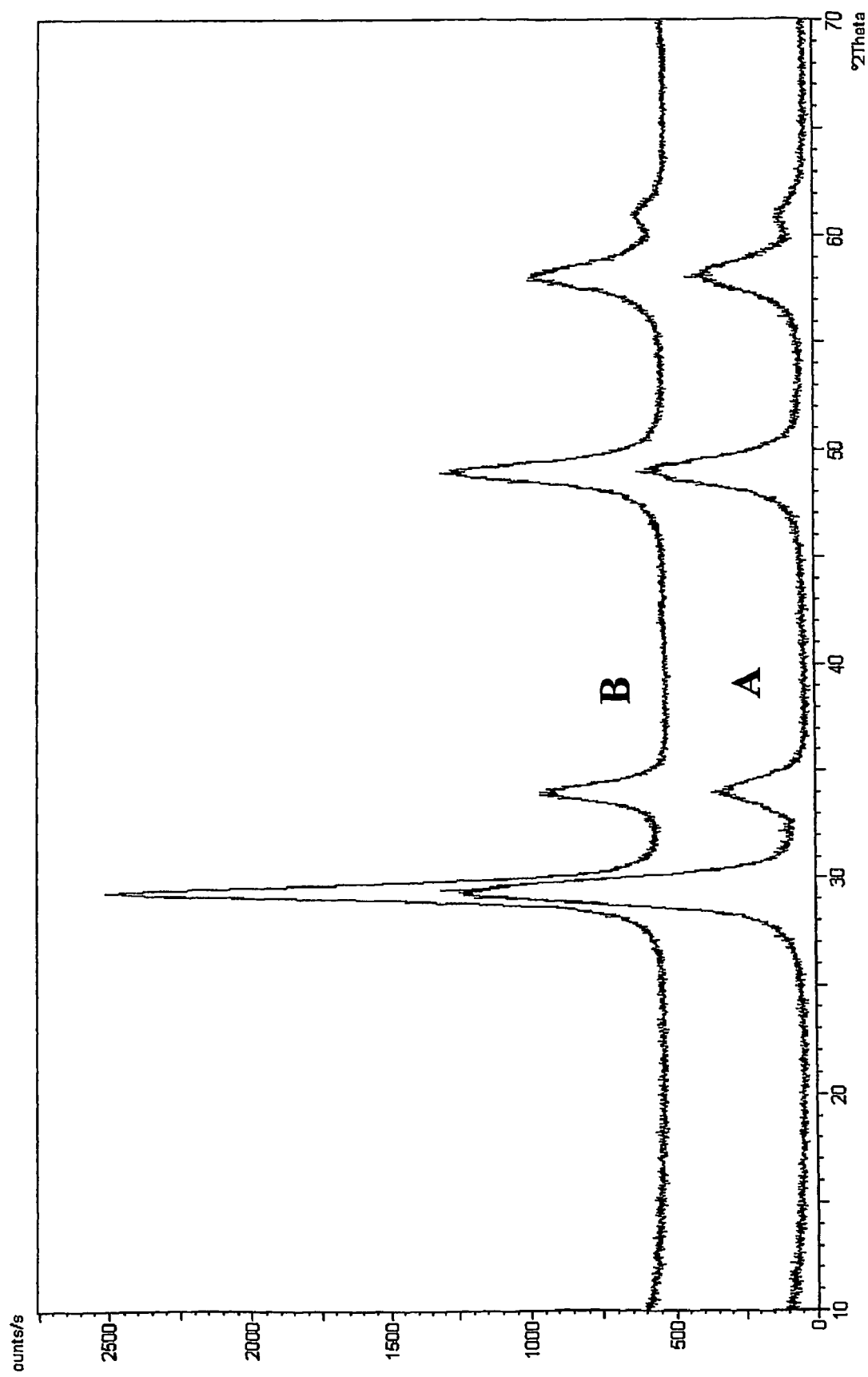
FIG. 1 shows the results of conventional X-ray diffractometry performed on the specimens obtained in Example 1: (A) after calcination at 700° C. for 4 hours and (B) after a heat treatment at 950° C. for 2 hours.

By way of illustration, some preferred embodiments of this invention will be described below with reference to the following examples and comparative examples.

EXAMPLE 1

A mixture of 234 g of an aqueous solution of zirconium oxychloride (20 wt % $ZrO_2$) with a molar ratio (Cl/Zr) of 2, 213 g of an aqueous solution of cerium nitrate (25 wt % $CeO_2$) and 219 g of an 8.6 wt % aqueous solution of sulphuric acid (corresponding to $SO_4^{2-}/Zr^{4+}=0.5/1$) was prepared, and a 10 wt % aqueous solution of NaOH was added dropwise to the mixture with stirring. A white precipitate formed by the time when the pH reached approximately 1.5. The precipitate was confirmed by observation with the scanning electron microscope to be composed of secondary particles with an average particle diameter of approximately 0.2 μm, which were composed of primary particles with a particle diameter of approximately 0.04 μm.

While continuing the stirring and maintaining the temperature of the reaction system at 40° C. or lower, the dropwise addition of the 10 wt % aqueous solution of NaOH was continued until the pH became approximately 8. At this point, a 30 wt % aqueous solution of NaOH was substituted for the 10 wt % aqueous solution of NaOH and the dropwise addition was continued with stirring until the pH became approximately 13 and thereafter the stirring was continued at this pH for another one hour.

The precipitate thus obtained was collected by filtration and washed with 3 liters of deionised water at 60° C. to give a washed cake of zirconium—cerium mixed hydroxide. The zirconium—cerium mixed hydroxide was confirmed by observation with the scanning electron microscope to be composed of tertiary particles with an average particle diameter of approximately 5 μm which were formed by loose aggregation of secondary particles with a particle diameter of approximately 0.2 μm The washed cake was dried at 110° C. for 16 hours, then calcined at 700° C. for 4 hours and allowed to cool to room temperature to give 100 g of zirconium—cerium-based mixed oxide [$ZrO_2$, 47 wt %; $CeO_2$, 53 wt % (45 mol %)] in the form of yellow powder.

To examine the thermal stability of the zirconium—cerium-based mixed oxide obtained above, a sample which had been calcined at 700° C. for 4 hours was submitted to a further heat treatment at 950° C. for 2 hours and its BET surface area was determined, as specified by JIS R 1626, to be 31 $m^2/g$.

Moreover, to examine the homogeneity of its crystallinity, X-ray diffractometry was performed on specimen A which had been calcined at 700° C. for 4 hours and specimen B which had been additionally heated at 950° C. for 2 hours. The results shown in FIG. 1 indicate that both specimens A and B are composed of a single crystal phase.

EXAMPLE 2

A zirconium—cerium-based mixed oxide was prepared as in the aforementioned Example 1 except using 219 g of an 11.06 wt % aqueous solution of sulphuric acid (corresponding to $SO_4^{2-}/Zr^{4+}=0.65/1$) in place of 219 g of an 8.6 wt % aqueous solution of sulphuric acid (corresponding to $SO_4^{2-}/Zr^{4+}=0.5/1$).

The BET surface area (JIS R 1626) determined on the specimen obtained after heating at 950° C. for 2 hours as in Example 1 was 26 $m^2/g$.

Also, the X-ray diffractometry performed as in Example 1 indicates that the specimen heated at 950° C. for 2 hours in this Example 2 was composed of a single crystal phase.

EXAMPLE 3

One hundred grams of zirconium—cerium-based mixed oxide ($ZrO_2$, 47 wt %; $CeO_2$, 49 wt %; $La_2O_3$ 4 wt %) was prepared as a pale yellow powder as in Example 1 except using a mixture of 235 g of an aqueous solution of zirconium oxychloride (20 wt % $ZrO_2$) with a molar ratio ($Cl^-/Zr^{4+}$) of 2, 196 g of an aqueous solution of cerium nitrate (25 wt % $CeO_2$), 22 g of an aqueous solution of lanthanum nitrate (18.2 wt % $La_2O_3$) and 213 g of an 8.8 wt % aqueous solution of sulphuric acid (corresponding to $SO_4^{2-}/Zr^{4+}=0.5/1$).

The BET surface area (JIS R 1626) determined on the specimen obtained after heating at 950° C. for 2 hours as in Example 1 was 39 $m^2/g$.

Also the X-ray diffractometry performed as in Example 1 indicated that the specimen heated at 950° C. for 2 hours in this Example 3 was composed of a single crystal phase.

COMPARATIVE EXAMPLE 1

An attempt was made to prepare a zirconium—cerium-based mixed oxide by the dropwise addition of a 10 wt % aqueous solution of NaOH to a mixture of aqueous zirconium oxychloride, aqueous cerium nitrate and aqueous sulphuric acid as in Example 1 except using 219 g of 6.8% by weight aqueous sulphuric acid (corresponding to $SO_4^{2-}/Zr^{4+}=0.4/1$).

The results are as follows: the precipitate formed was gel-like and could not be filtered or washed and the target zirconium—cerium-based mixed oxide could not be prepared.

COMPARATIVE EXAMPLE 2

An attempt was made to prepare a zirconium—cerium-based mixed oxide by the dropwise addition of a 10 wt % aqueous solution of NaOH to a mixture of aqueous zirconium oxychloride, aqueous cerium nitrate and aqueous sulphuric acid as in Example 1 except using aqueous zirconium oxychloride with a molar ratio ($Cl^-/Zr^{4+}$) of 3 with the same 219 g of 6.8% by weight aqueous sulphuric acid (corresponding to $SO_4^{2-}/Zr^{4+}=0.4/1$).

The results are as follows: the precipitates formed could eventually be filtered and washed, although the time required therefor was three times that in Example 1 and, furthermore, the calcined material was not a powder but a hard aggregate and its pulverisation required an excessively long period of time.

COMPARATIVE EXAMPLE 3

An attempt was made to prepare a zirconium—cerium-based mixed oxide by the dropwise addition of a 10 wt % aqueous solution of NaOH to a mixture of aqueous zirconium oxychloride, aqueous cerium nitrate and aqueous sulphuric acid as in Example 1 except using 219 g of 17.0% by weight aqueous sulphuric acid (corresponding to $SO_4^{2-}/Zr^{4+}=1/1$).

The zirconium—cerium-based mixed oxide obtained after heat treatment at 950° C. for 2 hours was found by X-ray diffractometry to be composed of two kinds of crystal phase.

COMPARATIVE EXAMPLE 4

An attempt was made to prepare a zirconium—cerium-based mixed oxide as in Example 1 except controlling the maximum temperature of the reaction system at 55° C. during the addition of the 10 wt % aqueous solution of NaOH in the pH range above 1.5.

The zirconium—cerium-based mixed oxide obtained after heating at 950° C. for 2 hours was found by X-ray diffractometry to be composed of two kinds of crystal phase.

COMPARATIVE EXAMPLE 5

Into 273 g of de-ionised water was sufficiently dispersed with stirring 180 g of a moist cake of basic zirconium sulphate with an average particle diameter of 1.6 μm 213 g of an aqueous solution of cerium nitrate (25 wt % $CeO_2$) was added to the resulting slurry, and a 10 wt % aqueous solution of NaOH was added dropwise to the mixture with stirring until the pH became 8. At this point, a 30 wt % aqueous solution of NaOH was substituted for the 10 wt % aqueous solution of NaOH, added until the pH became approximately 13 and the stirring was continued at this pH for another one hour.

Thereafter, filtration, washing, drying and calcination were carried out as in Example 1.

Two specimens of the zirconium—cerium-based mixed oxide obtained, one after calcination at 700° C. for 4 hours and the other after additional heat treatment at 950° C. for 2 hours, were both found by X-ray diffractometry to be composed of two kinds of crystal phases.

INDUSTRIAL APPLICABILITY

The process of this invention makes it possible to prepare with ease zirconium—cerium-based mixed oxides which are not only highly thermally stable at elevated temperatures but homogeneous in their crystal phase and particularly useful as promoters or catalyst supports in automobile exhaust gas purification.

The invention claimed is:

1. A process for preparing zirconium-cerium-based mixed oxides comprising reacting a mixture including: an alkali; an aqueous solution of a soluble zirconium salt containing zirconium cations; sulfate anions ($SO_4^{2-}$) in an amount of 0.42-0.7 mole of said sulfate anions ($SO_4^{2-}$) per mole of said zirconium cations; and soluble cerium salt; said reaction being carried out at a temperature of not greater than 50° C. to form a cerium-zirconium mixed hydroxide without zirconium basic sulfate, and then calcining the cerium-zirconium mixed hydroxide to form a mixed oxide of a single crystal phase.

2. A process as claimed in claim 1 wherein the alkali is added until the pH of the mixture is in the range 1-2, and wherein additional alkali is added to the mixture until the pH of the mixture is at least 8.

3. A process as claimed in claim 1 wherein the alkali is in the form of an aqueous solution.

4. A process as claimed in claim 1 wherein the cerium salt is added before the formation of any precipitate.

5. A process as claimed in claim 1 wherein the cerium salt is added after the formation of a precipitate.

6. A process as claimed in claim 1 wherein the alkali is present in an amount of 10-15% by weight in the mixture.

7. A process as claimed in claim 1 wherein the zirconium salt is selected from the group consisting of zirconium oxychloride, zirconium nitrate and a mixture thereof.

8. A process as claimed in claim 1 wherein the cerium salt is selected from the group consisting of cerium chloride, cerium nitrate and a mixture thereof.

9. A process as claimed in claim 1 wherein the sulfate anion ($SO_4^{2-}$) is introduced in the form of a sulfate compound selected from the group consisting of sulfuric acid, zirconium sulfate, cerium sulfate, sodium sulfate, potassium sulfate, ammonium sulfate, and combinations thereof.

10. A process as claimed in claim 1 wherein the mixture includes a chloride, a nitrate, or a chloride and nitrate of a third component cation selected from the group consisting of rare earth metals, alkaline earth metals and a mixture thereof, in an amount such that in the mixed oxide an oxide of the third component is present in an amount of up to 50% by weight.

11. A process as claimed in claim 1 wherein the mixed oxide comprises 90-10% by weight of zirconia ($ZrO_2$) and 10-60% by weight of ceria ($CeO_2$).

12. A process as claimed in claim 10 wherein said alkali is added after the zirconium salt solution, cerium salt and third component, and wherein the total concentration of the zirconium, cerium and third component in the mixture during the reaction expressed as oxides is 10-20% by weight of the mixture prior to the addition of alkali.

13. A process as claimed in claim 1 wherein in the mixed oxide formed the sulfate content is 0.1% by weight or less.

14. A process as claimed in claim 1 wherein the zirconium salt is selected from the group consisting of zirconium oxychloride, zirconium nitrate and a mixture thereof with a $Cl^-$ or $NO^{3-}/Zr^{4+}$ molar ratio of 1.5-4.0.

15. A process as claimed in claim 14 wherein said $Cl^-$ or $NO^{3-}/Zr^{4+}$ molar ratio is 2.0-3.0.

16. A process as claimed in claim 10 wherein said rare earth metals are selected from the group consisting of Pr, La, Nd and Y.

17. A process as claimed in claim 10 wherein said alkaline earth metals are selected from the group consisting of Mg, Ca, Ba, Al and Si.

18. A process as claimed in claim 10 wherein the mixed oxide comprises 90-10% by weight of zirconia ($ZrO_2$), 10-60% by weight of ceria ($CeO_2$) and up to 50% by weight of the third component oxide.

19. A process as claimed in claim 13 wherein in the mixed oxide formed the sulfate content is 0.05% by weight or less.

20. A process as claimed in claim 1 wherein the alkali is added so as to carry out said reaction at said temperature, and in said mixed oxide formed the sulfate content is 0.1% by weight or less.

* * * * *